United States Patent [19]

Iwata et al.

[11] 4,372,657
[45] Feb. 8, 1983

[54] DEVICE FOR INDICATING PHOTOGRAPHIC EXPOSURE CONDITIONS

[75] Inventors: Hiroshi Iwata, Nara; Tetsuo Yamaoka, Osaka, both of Japan

[73] Assignee: West Electric Co., Ltd., Osaka, Japan

[21] Appl. No.: 272,168

[22] Filed: Jun. 10, 1981

[30] Foreign Application Priority Data

Jun. 17, 1980 [JP] Japan .................................. 55-82649

[51] Int. Cl.³ .................. G03B 17/20; G03B 7/26; G03B 15/05; G03B 13/02
[52] U.S. Cl. .................................. 354/53; 354/60 L; 354/128; 354/289
[58] Field of Search ...................... 354/53, 60 E, 60 L, 354/127, 128, 155, 54, 55, 227, 219, 289; 352/171; 350/331 R

[56] References Cited

U.S. PATENT DOCUMENTS 4,021,828  5/1977  Iura et al. .................. 354/289 X
4,152,846  5/1979  Witt ............................. 350/331 R X

FOREIGN PATENT DOCUMENTS 1354225  5/1974  United Kingdom ............. 354/60 E

Primary Examiner—William B. Perkey
Attorney, Agent, or Firm—Burgess, Ryan & Wayne

[57] ABSTRACT

In a camera, a device for indicating photographic exposure conditions in which an electrooptic element or window is incorporated in a finder system in such a way that when exposure conditions such as the brightness of an object, the conditions of a battery and the condition of an electronic flash device are unsatisfactory so that an erratic exposure will result, the electrooptic element or window is rendered opaque totally or intermittently so that the image of an object cannot be viewed or is hardly viewed.

5 Claims, 13 Drawing Figures

DEVICE FOR INDICATING PHOTOGRAPHIC EXPOSURE CONDITIONS

BACKGROUND OF THE INVENTION

The present invention relates to a device for indicating photographic exposure conditions.

There have been devised and demonstrated camera finder systems through which one can view a light-emitting element such as a light-emitting diode or the moving pointer of an ammeter which display an exposure condition. Since the light-emitting element or the moving pointer appears together with the image of an object, one tends to view the image of an object more intensely than the light-emitting diode or moving pointer, so that one very frequently neglects the warning given by the latter. As a result, erratic exposures or over- or under-exposures frequently result. This erratic exposure problem is inherent to the prior art finder system through which one must view the image of an object and a display device independently.

There has been also devised and demonstrated a finder system (See Japanese Utility Model Publication No. 10982/1980) of the type in which a ground glass has a liquid-crystal pattern or window. If exposure conditions are satisfactory, in response to the output signal from detection means for detecting exposure conditions, the liquid-crystal pattern is rendered transparent so that the image of an object can be viewed, but if exposure conditions are not satisfactory, the liquid-crystal pattern glass is rendered opaque so that the pattern is visible but the image of an object cannot be observed totally and consequently one is given the warning that the exposure conditions are not satisfactory. However, the image of an object is always focused upon the ground glass and the liquid-crystal pattern vanishes only when the object is sharply focused on the ground glass. In addition, the liquid-crystal pattern generally appears at the center of the ground glass. Therefore, the image of an object and the liquid-crystal pattern are mixed, so that one very frequently misses the liquid-crystal pattern. As a result, out-of-focus frequently results.

SUMMARY OF THE INVENTION

The present invention was made in order to solve the above and other problems encountered in the prior art camera finder system.

According to the present invention, whether all the exposure conditions are satisfactory or not; that is, whether, for instance, the image of an object is sharply focused or not can be distinctly indicated, so that an exposure under unsatisfactory exposure conditions such as out-of-focus can be avoided.

According to the present invention, an electro-optic element or window is incorporated in a camera finder system. If every exposure condition is unsatisfactory, the electrooptic element or window is rendered opaque, so that the image of an object cannot be viewed totally or partially.

The above and other objects, effects and features of the present invention will become more apparent from the following description of preferred embodiments of the present invention taken in conjunction with the accompanying drawings.

DESCRIPTION OF THE PREFERRED EMBODIMENTS

Figure 1A:
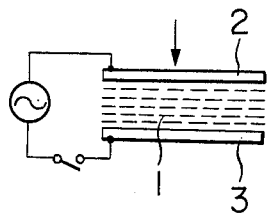
FIGS. 1A, 1B and 1C show a DSM type liquid-crystal device, a TN type liquid-crystal device and a "guest-host" type liquid-crystal device, respectively, which may be used in the present invention.

In FIG. 1A is shown a DSM type liquid-crystal device in which a nematic liquid-crystal 1 is sandwiched between two glass plates 2 and 3 so that the molecules are homogeneously arranged. When no electric field is applied, the liquid crystal is transparent, but when an electric field is applied, the molecular pattern is disrupted so that the incident light is scattered.

Figure 1B:
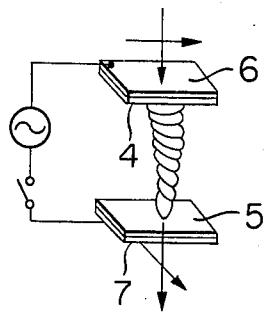

In FIG. 1B is shown a TN type liquid-crystal device in which a cell in which the molecules are arranged in a twisted pattern is sandwiched between two glass plates 4 and 5 and a polarizer 6 is attached to the glass plate 4 while an analyzer 7 is attached to the glass plate 5 in such a way that their planes or axes of polarization are coincident. When no electric field is applied, the display device is opaque, but when an electric field is applied, the display device becomes transparent. Alternatively, by using a suitable combination of a polarizer and an analyzer, the display device becomes opaque when applied with an electric field while it remains transparent when not applied with an electric field.

Figure 1C:
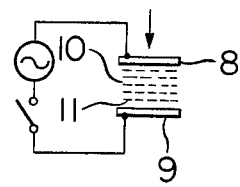

In FIG. 1C is shown a "guest-host" type liquid-crystal device in which a liquid-crystal 10 and a dye 11 are sandwiched between two glass plates 8 and 9. According to whether an electric field is applied or not, the color of the display is changed.

Of these three types of liquid-crystal devices, the present invention will be described in conjunction with the DSM type liquid-crystal device to be referred to as an "LC window".

Figure 2:
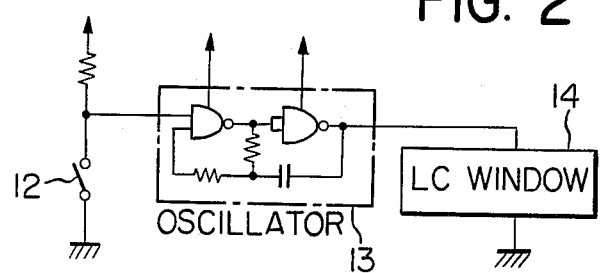
FIGS. 2 to 5 show circuit diagrams of first to fourth embodiments, respectively, of the present invention.

In an embodiment shown in FIG. 2, an LC window 14 is operatively connected to a lens-door locking means which locks a lens door in order to prevent contamination and damage to a camera lens when the camera is not used. When the lens door is removed, a switch 12 is closed so that an oscillator 13 is deactivated and consequently the LC window 14 becomes transparent. Therefore, if the LC window 14 is incorporated in a finder system, one cannot view an object when the lens door is closed, but one can view an object when the lens door is opened. As a result, an erratic exposure with the lens door remaining closed can be avoided.

Figure 3:
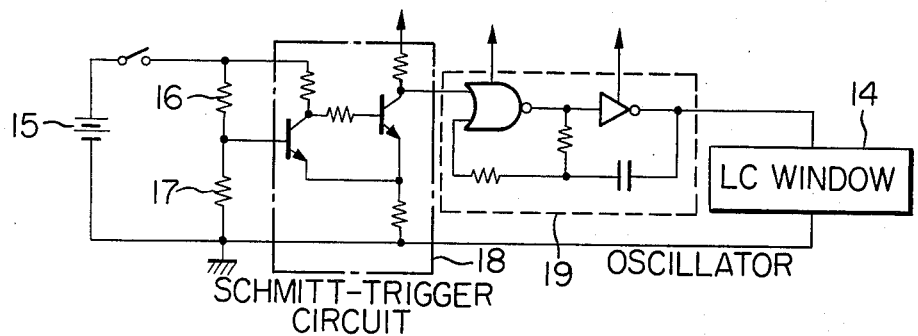

In a second embodiment of the present invention shown in FIG. 3, the LC window 14 is incorporated in a battery-check circuit. A voltage of a battery 15 is divided by resistors 16 and 17 and applied to a Schmitt-trigger circuit 18. When the voltage of the battery 15 is higher than a predetermined level, the Schmitt-trigger circuit 18 delivers a high level output signal so that an oscillator 19 is disabled. As a result, the LC window 14 becomes transparent.

Therefore, if the LC window is incorporated in a viewfinder system, one cannot view when the voltage of the battery 15 drops below a predetermined level and is warned that the battery 15 must be replaced with a new one. In the case of a conventional battery-check circuit of the type which lights a light-emitting diode or activates a sound generating means when the voltage of a battery drops below a predetermined level, it is very inconvenient and troublesome when the light-emitting diode is disposed within the viewfinder because one must view the image of an object and the light-emitting diode. In the case of the sound generating warning means, the warning sound cannot be heard in noisy environments.

Figure 4:
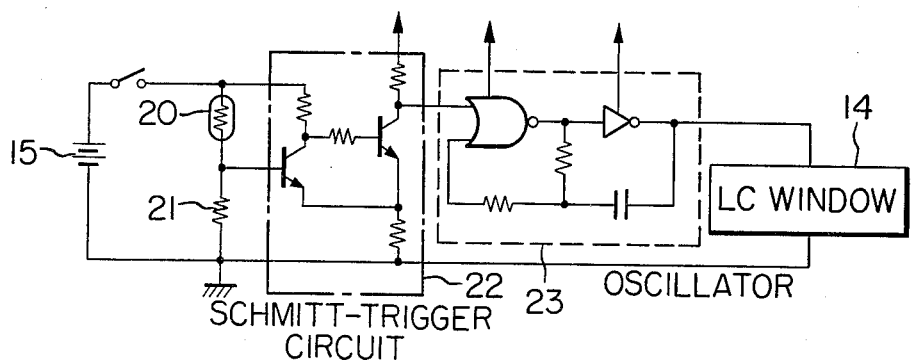

In a third embodiment shown in FIG. 4, the LC window 14 is incorporated in a viewfinder system, so that one can detect the brightness of an object. When the brightness of an object which is detected by a photosensor 20 is higher than a predetermined level, a voltage across a resistor 21 is high so that the output from a Schmitt-trigger circuit 22 is high and consequently an oscillator 23 is disabled. As a result, the LC window 14 becomes transparent so that one can see the image of an object only when its brightness is higher than a predetermined level.

Figure 5:
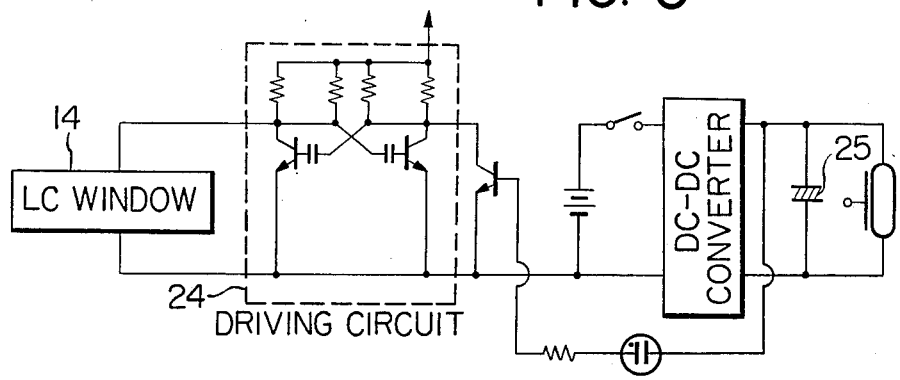

In FIG. 5 is shown a fourth embodiment of the present invention the LC window 14 is used to indicate whether a flash exposure is possible or not. In an electronic flash device, when the voltage charged across a main capacitor rises to a level sufficient to flash a flash lamp, the output signal from a voltage-detection circuit comprising a neon lamp and a resistor (not shown) turns on a transistor so that a driving circuit 24 which applies a voltage across the LC window 14 is disabled. As a result, the LC window 14 becomes transparent. Therefore, when the LC window 14 is incorporated in a viewfinder, one can view the image of an object when a flash exposure is ready.

So far the present invention has been described in conjunction with the DSM type LC window 14, but it is understood that the present invention may be equally carried out with the TN or guest-host type LC window.

Figure 6:
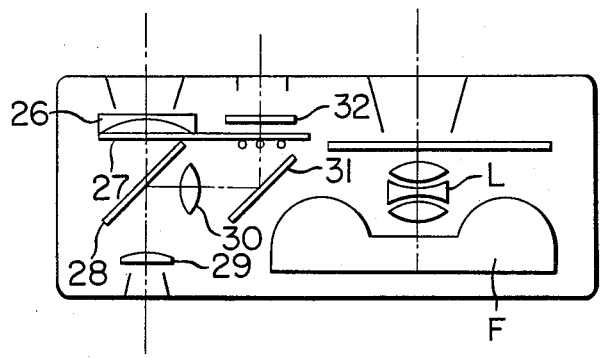
FIG. 6 shows a fifth embodiment of the present invention in which a liquid-crystal device or window in accordance with the present invention is incorporated in a finder system of a pocket camera.

In a fifth embodiment of the present invention shown in FIG. 6, an LC window 27 is disposed in a finder system of a pocket camera. The finder system comprises an objective lens 26, a half-mirror 28, an eyepiece 29, a target lens 30, a reflecting mirror 31 and a frosted-glass plate 32. The camera has a photographic lens L and a film cassette F.

Figure 7:
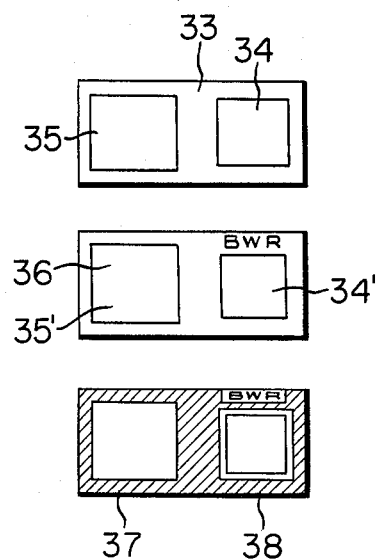
FIG. 7 shows the construction of the liquid-crystal device or window used in the fifth embodiment.

The construction of the LC window 27 is shown in detail in FIG. 7. A liquid crystal is sandwiched between a back glass plate 33 formed with square electrodes 34 and 35 and a front glass plate 36 formed with square electrodes 34' and 35' and marked with "B" which stands for battery check, "W" which stands for brightness check and "R" which stands for flash-exposure-readiness check. The glass plates 33 and 36 are bonded together as indicated by the latched area 37 and if required, a view frame 38 may be added.

Figure 8:
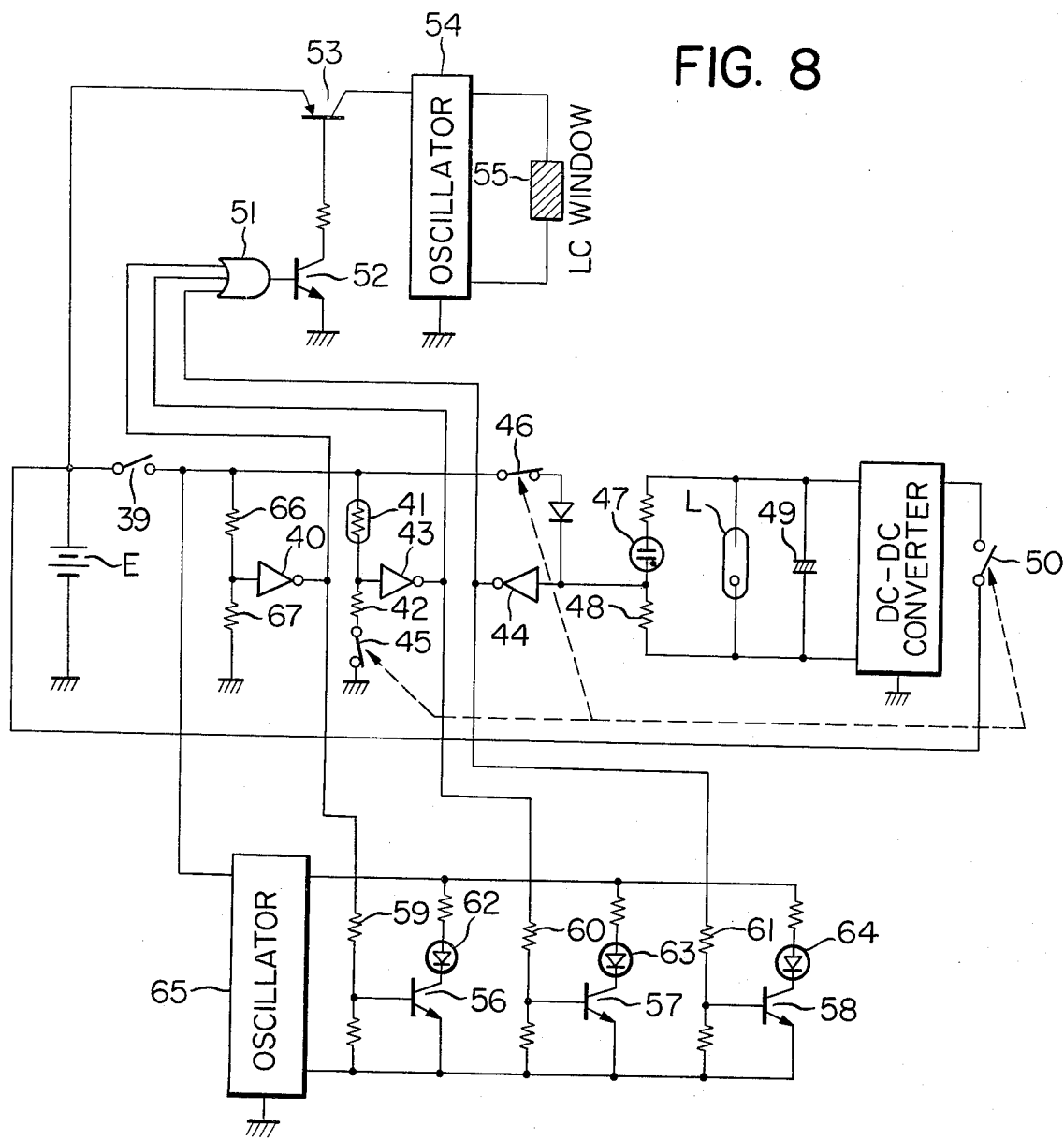
FIG. 8 shows the circuit diagram of a sixth embodiment of the present invention.

In a sixth embodiment shown in FIG. 8, a TN or guest-host type LC window is used for various displays and the LC window becomes transparent when applied with an electric field.

When a shutter release button is depressed, a switch 39 is closed so that a power supply E is connected to a battery-check circuit, a brightness-check circuit and an oscillator for driving light-emitting diodes.

If the voltage obtained by dividing the power supply voltage by resistors 66 and 67 is higher than an inverting voltage of a comparator 40; that is, the voltage of the power supply E is higher than a predetermined level, the output of the comparator 40 is low, and vice versa.

In the brightness-check circuit, if the voltage obtained by dividing the voltage of the power supply E by a photosensor 41 and a resistor 42 is higher than an inverting voltage of a comparator 43 when the brightness of an object is higher than a predetermined level, the output from the comparator 43 is low. However, when the brightness of an object is lower than a predetermined level, the output is high.

Assume that the voltage of the power supply E be higher than a predetermined level and the brightness of an object be below a predetermined level. Then the output from the comparator 43 is high, so that the output from a NOR gate 51 is low. As a consequence, transistors 52 and 53 are not turned on, so that the power supply E is disconnected from an oscillator 54 and consequently an LC window 55 which is transparent when a power supply is applied remains opaque. As a result, one cannot view the image of an object through a finder system. The output of the comparator 43 is high, so that a current flows through a resistor 60 into the base of a transistor 57. Therefore, the transistor 57 is turned on, so that an oscillator 65 is turned on and consequently a light-emitting diode 63 is intermittently flashed, giving the warning that the brightness of an object is less than a predetermined level and a flash exposure is needed.

In response to this warning signal, an on-off switch 50 of an electronic flash device is closed. Then, switches 45 and 46 are opened so that the output from the comparator 43 drops to a low level and consequently the transistor 57 is turned off. As a result, the light-emitting diode 63 is turned off. As a result, the low-level inputs are applied from the comparators 40 and 43 to a NOR gate. Unless the voltage charged across a main capacitor 49 becomes higher than a predetermined level, the high-level output from a comparator 44 is applied to the NOR gate 51. As a result, the LC window 55 remains opaque. Since the high-level output from the comparator 44 is applied to a transistor 58, the latter is turned on so that a light-emitting diode 64 is intermittently flashed, giving the warning that a flash lamp L is not ready to flash.

If the voltage across the main capacitor 49 rises above a predetermined level so that the flash lamp L is ready to be lighted, a neon lamp 47 is turned on and a voltage across a resistor is applied to the comparator 44. As a result, the output of the comparator 44 drops to a low level so that the light-emitting diode 64 is turned off. Concurrently, all the inputs to the NOR gate 51 become low, so that the output therefrom becomes high. As a result, the transistors 52 and 53 are turned on and subsequently the oscillator 54 is turned on so that the LC window 55 becomes transparent and the image of an object can be viewed through the finder. Thus one is ensured that a flash exposure is ready.

Figure 9:
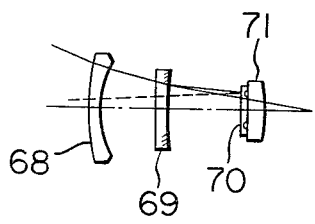
FIG. 9 shows a seventh embodiment of the present invention.
Figure 10:
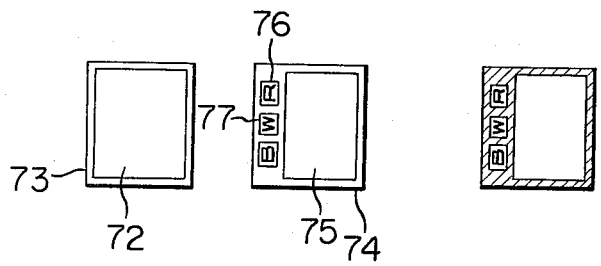
FIG. 10 shows the construction of a liquid-crystal device or window used in the seventh embodiment.

In a seventh embodiment of the present invention as shown in FIG. 9, an LC window 70 is disposed in an Albada finder comprising an objective lens 68, a mirror 69 whose concave surface is partially coated with a total reflecting film or the like and an eyepiece 71. As shown in FIG. 10, the LC window 70 consists of a glass plate 73 formed with a square electrode 72, a glass plate 74 formed with a square electrode 75 and small square electrodes 76, 77 and 78 marked with "B", "W" and "R" as in the case of the LC window as shown in FIG. 7 and a liquid crystal sandwiched between the glass plates 73 and 74 which are bonded together as indicated by the hatched area.

Figure 11:
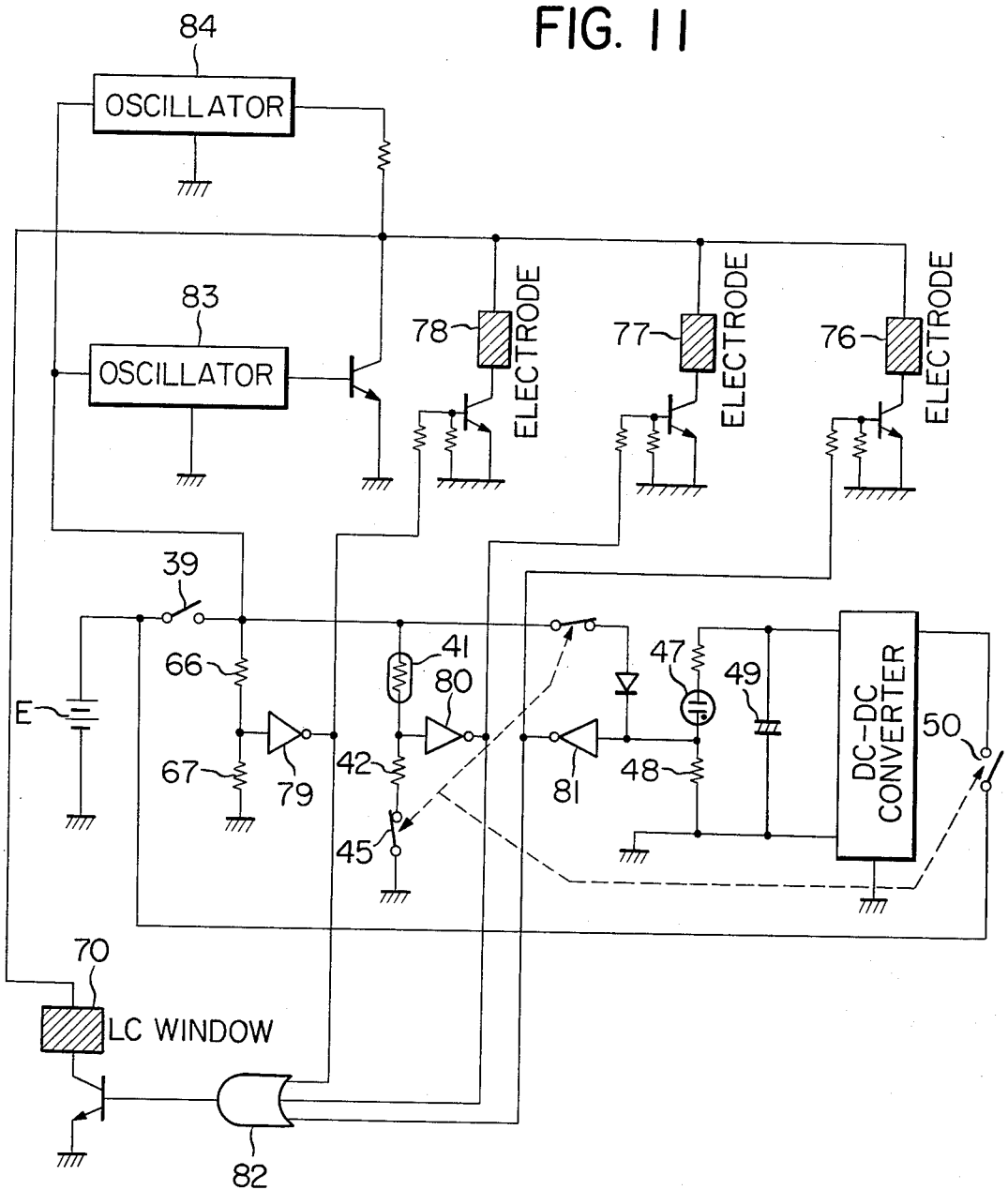
FIG. 11 is the circuit diagram of the seventh embodiment.

In FIG. 11 is shown the diagram of an electric circuit associated with the LC window 70. The mode of operation is substantially similar to that described above with reference to FIG. 8. A comparator 79 delivers the output signal representative of the condition of the power supply E; that is, the signal indicating whether the voltage of the power supply E is higher or lower than a predetermined level. A comparator 80 delivers the output signal indicating whether the brightness of an object is higher or lower than a predetermined level. A comparator 81 delivers the output signal indicating whether the voltage across the main flash capacitor 49 has reached a predetermined level or not. An oscillator 83 oscillates at a frequency of about 1 Hz and another oscillator 84 oscillates at a frequency of about 60 Hz and drives the LC window 70. Even when the outputs from the comparators 79, 80 and 81 are applied to an OR gate 82, the LC window 70 intermittently becomes opaque, so that one can view the image of an object intermittently and at the same time is warned that the exposure conditions are not satisfactory as the liquid-crystal over the electrode 76 and/or the electrode 77 and/or electrode 78 bearing the marks "B", "W" and "R", respectively, becomes intermittently opaque and these intermittent flashes of "B", "W" and "R" are reflected back from the mirror 69 to the eyepiece 71.

It is to be understood that the present invention may use electrochromic elements instead of liquid-crystals.

As described above, according to the present invention, depending upon exposure information or conditions an electrooptic device disposed in a finder system is driven in such a manner that when the exposure conditions are unsatisfactory, an eyepiece is closed or intermittently opened and closed and consequently an object cannot be viewed or can be viewed only intermittently. As a result, erratic exposures can be avoided.

What is claimed is:

1. A view finder for a camera including means for providing a warning of unsatisfactory exposure conditions, comprising:
   a window through which a subject may be viewed, said window comprising an electro-optical element having a transparent state and an opaque state, the state of said window being determined by an electrical control signal applied thereto;
   means responsive to a plurality of exposure-affecting conditions of said camera for setting said electrical control signal at a first value when all of said conditions are satisfactory and at a second value when any one of said conditions is unsatisfactory; and
   a driving circuit connected to said window and responsive to said electrical control signal for (i) rendering the entire window transparent when said electrical control signal has said first value, and (ii) rendering the entire window continuously or intermittently opaque to block the view of said subject when said electrical control signal has said second value.

2. The view finder according to claim 1, wherein said exposure-affecting conditions comprise the brightness of said subject and the condition of a camera battery.

3. The view finder according to claim 1, wherein said exposure-affecting conditions include the condition of locking of a lens door of said camera.

4. The view finder according to claim 1, wherein said exposure-affecting conditions include the state of readiness of an electronic flash for said camera.

5. The view finder according to claim 1, wherein said view finder includes a plurality of exposure condition warning lights viewable through said window, said lights being continuously or intermittently blocked when said electrical control signal has said second value.

* * * * *